United States Patent [19]
Chittineni

[11] Patent Number: 4,648,120
[45] Date of Patent: * Mar. 3, 1987

[54] EDGE AND LINE DETECTION IN MULTIDIMENSIONAL NOISY, IMAGERY DATA

[75] Inventor: Chittibabu Chittineni, Ponca City, Okla.

[73] Assignee: Conoco Inc., Ponca City, Okla.

[*] Notice: The portion of the term of this patent subsequent to Feb. 12, 2002 has been disclaimed.

[21] Appl. No.: 696,026

[22] Filed: Jan. 29, 1985

Related U.S. Application Data

[63] Continuation-in-part of Ser. No. 394,674, Jul. 2, 1982, Pat. No. 4,499,598.

[51] Int. Cl.$^4$ .............................................. G06K 9/40
[52] U.S. Cl. ....................................... 382/54; 382/22; 382/27
[58] Field of Search ................... 382/21, 22, 27, 54; 358/282, 284

[56] References Cited

U.S. PATENT DOCUMENTS

4,487,476 12/1984 Hester et al. ..................... 364/822
4,499,598 2/1985 Chittineni ........................... 382/22

Primary Examiner—Leo H. Boudreau
Assistant Examiner—Jose L. Couso
Attorney, Agent, or Firm—Charles E. Quarton

[57] ABSTRACT

A machine process for identification and extraction of magnitude and direction of edges and lines in noisy multidimensional imagery data. A digital picture function is viewed as a sampling of the underlying reflectance function of the objects in the scene or pattern with noise added to the true function values. The edges or lines relate to those places in the image where there are jumps in the values of the reflectance function or its derivatives. By expressing the function in some parametric form in the local neighborhood of the pixel under consideration, the edges or lines and the types of edges (left to right or right to left) or lines (peak to trough) may be inferred from the values of the parameters. Assuming the noise is Gaussian, significant edges or lines are detected by performing the statistical hypothesis tests on the parameters of the function. Recursive relations are used for efficiently estimating the parameters of the function.

10 Claims, 17 Drawing Figures

EDGE AND LINE DETECTION IN MULTIDIMENSIONAL NOISY, IMAGERY DATA

CROSS REFERENCE TO RELATED APPLICATION

This application is a continuation-in-part of U.S. patent application Ser. No. 394,674 as filed on July 2, 1982, under title of "Edge and Line Detection in Multidimensional Noisy Imagery Data," now U.S. Pat. No. 4,499,598.

BACKGROUND OF THE INVENTION

1. Field of the Invention

The invention relates generally to digital pattern recognition systems and, more particularly, but not by way of limitation, it relates to an improved form of pattern detection device for use with multidimensional data in the presence of noise.

2. Description of the Prior Art

Generally, the prior art has been limited to various forms of two-dimensional recognition process wherein digital image processing is carried out using two-dimensional operators in processing a single image plane and the selection of thresholds is a difficult task at best. The prior art proposals employed a variety of operators for detection of edges and lines by fitting a planar surface to a picture function in the neighborhood of each image point and then taking the derivatives of the function at that point. The prior operators worked on single plane images. Such prior art digital picture processing technique is disclosed by Prewitt in "Object Enhancement and Extraction in Picture Processing and Psycho Pictorics", Academic Press, New York, 1970, PP. 75, 149. More recently, Haralick introduced the noise term and devised statistical tests for the detection of significant edges by fitting a plane in the neighborhood of a point for a two-dimensional image, and this teaching is presented in "Edge and Region Analysis of Digital Image Date" as presented in Computer Graphics and Image Processing, Volume 12, 1980, PP. 60–73.

Several prior sources have treated the surface fitting using orthogonal two-dimensional basis functions, e.g. walsh functions, orthonormal fourier functions and orthogonal polynomials. All of the derived operators work upon a two-dimensional plane or single band image. Still more recently, Morgenthaler and Rosenfeld generalized the aforementioned Prewitt operators to n-dimensions by fitting a hyperquadric surface. However, noise is not introduced into the formulation. The Morgenthaler and Rosenfeld teachings are presented in an article entitled "Multidimensional Edge Detection by Hypersurface Fitting", IEEE Transactions, Pattern Analysis and Machine Intelligence, July 1981, PP. 482–486.

In the patented prior art, some patents of general interest are as follows: Sternberg—U.S. Pat. No. 4,322,716; Golay—U.S. Pat. No. 4,060,713; and Kono—U.S. Pat. No. 4,110,736.

SUMMARY OF THE INVENTION

The present invention relates to digital machine processing to achieve identification and extraction of edges and lines and directional edges and lines in noisy multidimensional image data. The present invention differs from the prior techniques in that multidimensional operators and optimal statistical tests are developed for the extraction of significant edges and lines from multidimensional noisy data. The digital picture function is viewed as a sampling of the underlying reflectance function of the objects in the scene with noise added to the true function values. Thus, the edges or lines relate to places in the image where there are jumps in the values of the function or its derivatives. By expressing the function in some parametric form, the edges or lines are inferred from the values of the parameters. Multidimensional or multi-band data is input for subsequent processing through routines for effecting detection of edges and lines to develop data relating to the magnitude and direction of the edge or line. Upon perfection of this data for a series of pixel evaluations constituting a full image scene, additional processing routines for linking the data may be selectively called up for contribution to the final output display of the multidimensional data.

Therefore, it is an object of the present invention to identify and extract edges and lines in noisy, multidimensional image data, for example, the linear features in multi-band Landsat image data, three-D seismic horizon data and the like.

It is also an object of the invention to provide a digital machine process for evaluating multi-band geographic surveillance data to provide recognition of linears, lineaments, vegetation variations, and other multiple band reflectance parameters emanating from earth surface areas.

It is still further an object of this invention to provide a versatile machine processing program capable of processing a considerable plurality of simultaneous band or depth responses over selected, interconnected neighborhood image elements.

Finally, it is an object of the present invention to perform digital pattern recognition of multi-band data while eliminating the effects of noise present in the input data.

Other objects and advantages of the invention will be evident from the following description when read in conjunction with the accompanying drawing which illustrate the invention.

DETAILED DESCRIPTION OF THE INVENTION

Figure 1:
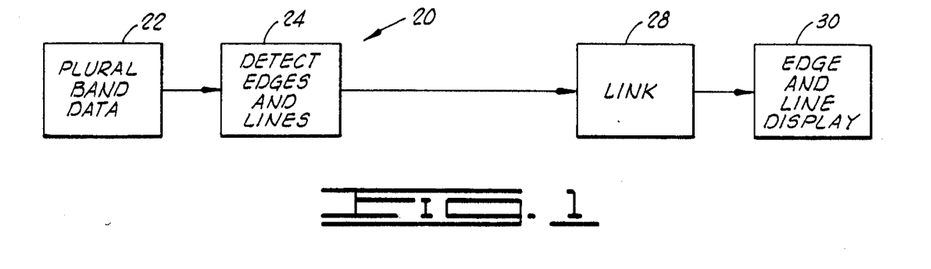
FIG. 1 is a block diagram illustrating the basic elements of the present edge and line detection system.

FIG. 1 illustrates the major system portions of a machine processing system 20 for edge and line detection in multidimensional noisy imagery data. The system 20 can be used for examinations of plural band input data of various types as is input in digitized form for storage at stage 22. Such plural band data may be any of the multi-band Landsat data images, three-dimensional seismic horizon data, or other forms of related data in a plurality of distinct band responses.

The multidimensional data input is applied in scan sequence through stage 24 which functions to detect edge and line data relative to the multidimensional images. System 20 next performs a link routine in stage 28 and, finally, output display 30 provides an edge and line display at selectively varied significance levels of the multi-band image data. The processing system 20 is the function of two programs and two sub routines, as presently constituted, which implement and control operation of a digital computer type VAX 11-780, as available from Digital Equipment Company.

Figure 2:
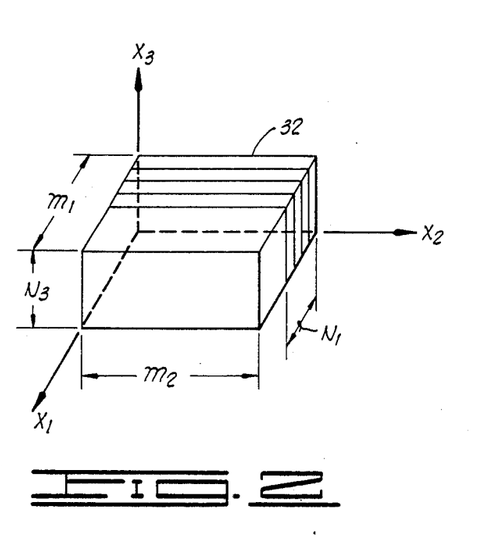
FIG. 2 is an idealized drawing of a three-dimensional image with size designations as utilized in the present invention.

The present invention is particularly described with respect to four-band Landsat data of the type acquired from the United States government in digital tape form for whatever the selected earth areas of interest; however, it should be understood that various types of multidimensional, related image data can be processed in like manner and the present invention is particularly adapted for picking selected linear horizons of three-dimensional seismic data. The display 30 is a conventional type of color video display that is compatible with the particular computer equipment. The video display is divided up into a pixel array, 512 pixels by 512 pixels, and this pixel field is equated to the image field of view in the $X_1$ and $X_2$ dimensions. Thus, FIG. 2 illustrates the three-dimensional coordinates as utilized in the present processing system with a $512 \times 512$ three-dimensional pixel array superimposed thereover, i.e. a 3-D image of size $m_1 \times m_2 \times N_3$.

Figure 3:
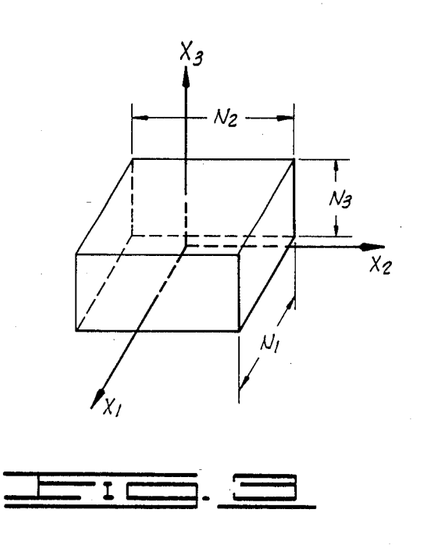
FIG. 3 illustrates the local neighborhood of a pixel and the positioning of the coordinate system in the present invention.
Figure 4:
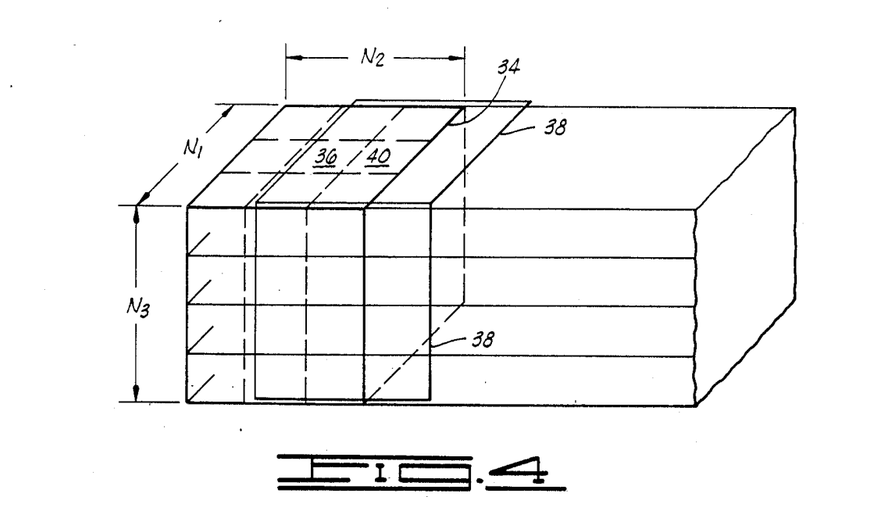
FIG. 4 is a view in perspective illustrating the manner in which the scanning of neighborhood pixels is effected.

FIG. 3 illustrates a local neighborhood of a pixel and its position relative to the coordinate system, such neighborhood being of a size $N_1 \times N_2 \times N_3$ as shown. Some typical dimensions as selected by the operator for implementation within the program of processing system 20 may be:

$m_1 = 512$
$m_2 = 512$
$N_3 = 4$
$N_1 = 3, 5, 7, 9, 11 \ldots$
$N_2 = 3, 5, 7, 9, 11 \ldots$ FIG. 4 illustrates the scanning procedure of pixel neighborhoods as it may be likened to scanning in the $X_2$ direction across the image block 32, i.e. from left to right, where $N_1 = 3$ and a 9 pixel neighborhood 34 is disposed around the central pixel 36. The neighborhood has a four pixel $N_3$ dimension along the $X_3$ axis as would be the case for four-band Landsat data. At completion of establishment of coefficients and requisite pixel data for pixel 36, the entire neighborhood 34 would shift rightward one pixel such that the next successive neighborhood would be shown by lines 38 surrounding central pixel 40. Such examination of all bands of data proceeds a pixel at a time rightward whereupon return to the left side of the $m_2$ dimension (see FIG. 2) would find the scan indexed one pixel in the $X_1$ direction for initiation of the next successive rightward scan of neighborhoods in the $N_2$ dimension.

The edges or lines refer to the places in the image where there are significant discontinuities in the values of the function or its derivatives. The existence of an edge or line at the point of the image is decided using information from the neighborhood for that point or pixel. Thus, hypersurfaces are fitted to the multidimensional picture function in the neighborhood of the pixel under consideration using discrete orthogonal polynomials as basis functions. Assuming the noise is Gaussian and independent from pixel to pixel, the coefficients of the fitted surfaces are shown to be unbiased and expressions for their variances are obtained. The directions of the edges and lines are estimated. The first and the second directional derivatives of the fitted function evaluated at the pixel under consideration are used in setting up the statistical hypothesis tests for the detection of edges and lines. These tests involve the computation of a variable having F-distribution in terms of the coefficients of the fitted surface, their variances and the error in the fit. The significant edges and lines are detected by comparing the computed variable with its critical value at a specified degree of confidence. If the value of the variable is greater than the critical value, the magnitude of the edge or line is taken to be the value of the variable. Otherwise, they are set to zero. Thus, for each point in the image, the magnitude and direction of the edge or line is computed.

For the detection of edges and lines at a particular orientation, the expressions are developed for the coefficients of the fitted surfaces and for their variances when the coordinate system is rotated by selected angle to that direction. Statistical tests are then carried out for the detection of significant edges and lines. Having observed that there is considerable redundancy in the computations for successive neighborhoods, the program utilizes recursive relationships in computing the coefficients of the fitted surface of a successive neighborhood.

In some cases, the detected edges or lines sometimes get disconnected. This is due to the variations in the reflectance function along the edge or line. In this case, the processing system uses the linking routine of Stage 28.

Figure 5:
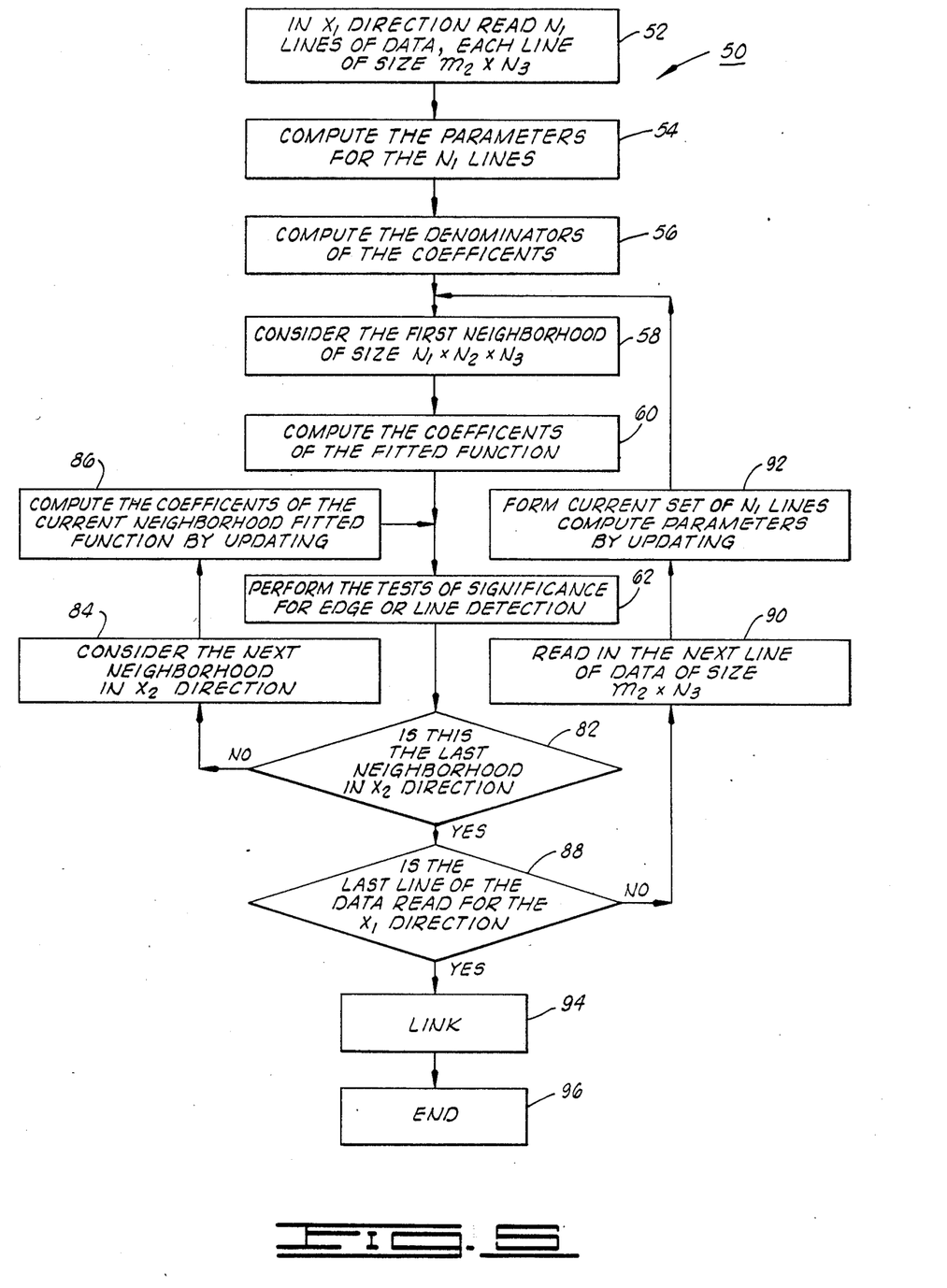
FIG. 5 is a flow diagram of the program utilized to effect the present invention.

FIG. 5 illustrates a processing flow diagram 50 which illustrates the program and sub-routine functions in control of the processing system 20 to carry out the method of the present invention. Thus, the initial stage 52 controls read-in of $N_1$ lines of data in the $X_1$ direction, each of the lines of data being of a size $m_2 \times N_3$. This input data is then processed at flow step 54 to compute the parameters for the $N_1$ lines of data. For this operation, let $f(X_1, X_2, X_3)$ be the picture function values in the $N_1$ lines of data read where $1 \leq X_1 \leq N_1$, $1 \leq X_2 \leq m_2$, $1 \leq X_3 \leq N_3$. Let $\pi_3$ be the domain of $X_3$ and let $\pi_{13}$ be the domain of $X_1, X_3$. Then, for each $X_1, X_2$ compute the following over domain $\pi_3$ with the coordinate system position at the center of $\pi_3$ for every $X_1, X_2$. Compute:

$$F_2(X_1, X_2, 1) = \Sigma_{\pi_3} f(X_1, X_2, X_3) \quad (1)$$
$$F_2(X_1, X_2, 2) = \Sigma_{\pi_3} f(X_1, X_2, X_3) X_3$$
$$F_2(X_1, X_2, 3) = \Sigma_{\pi_3} X_3^2 f(X_1, X_2, X_3)$$

For each $X_2$ compute the following over the domain $\pi_{13}$ with the coordinate system positioned at the center of $\pi_{13}$ for every $X_2$.
Compute:

$$F_1(X_2, 1) = \Sigma_{\pi_{13}}(X_1, X_2, X_3) \quad (2)$$
$$F_1(X_2, 2) = \Sigma_{\pi_{13}} X_1 f(X_1, X_2, X_3)$$
$$F_1(X_2, 3) = \Sigma_{\pi_{13}} X_3 f(X_1, X_2, X_3)$$
$$F_1(X_2, 4) = \Sigma_{\pi_{13}} X_1^2 f(X_1, X_2, X_3)$$
$$F_1(X_2, 5) = \Sigma_{\pi_{13}} X_3^2 f(X_1, X_2, X_3)$$
$$F_1(X_2, 6) = \Sigma_{\pi_{13}} X_1 X_3 f(X_1, X_2, X_3)$$

The process flow then proceeds to stage 56 which commands computation of the denominators of the coefficients for the hyperquadric surface that will be fit to reflectance function in a neighborhood of size $N_1 \times N_2 \times N_3$. Thus, let $X = X(X_0, X_1, \ldots X_n)^T$ be a point in the n-dimensional space. Let $\pi_0$ be the hyperrectangular local neighborhood of its central pixel, the pixel that is under consideration. Let the coordinate system be positioned so that the center of the region is at the origin. Let $\{S_i(X), 0 \leq i \leq N\}$ be a set of orthogonal basis functions defined over the neighborhood $\pi_0$. Let $f(X)$ be the digital picture function and let $g(X)$ be an estimate $f(X)$, estimated as a weighted sum of basis functions. That is:

$$g(X) = \sum_{i=0}^{N} a_i S_i(X) \quad (3)$$

where $\{a_i, 0 \leq i \leq N\}$ are a set of coefficients. The coefficients $a_i$ that minimize the total squared error $$e^2 = \Sigma_{\pi_0}(f(x) - g(x))^2 \quad$$

are given by $$a_i = \frac{\Sigma_{\pi_0} f(X) S_i(X)}{\Sigma_{\pi_0} S_i^2(X)} \quad (4)$$

Let the picture function $f(X)$ be written as $$f(X) = \sum_{i=0}^{N} a_i S_i(X) + \eta(X) \quad (5)$$

where $\eta(X)$ is a noise term and is assumed to be Gaussian with zero mean and variance $\sigma^2$. The noise $\eta(X)$ is also assumed to be independent from pixel to pixel. Then we have $$a_i = \alpha_i + \frac{\Sigma_{\pi_0} \eta(X) S_i(X)}{\Sigma_{\pi_0} S_i^2(X)} \quad (6)$$

The coefficients $a_i$ are unbiased and independent and their variances are given by $$\text{var}(a_i) = \frac{\sigma^2}{\Sigma_{\pi_0} S_i^2(X)} \quad (7)$$

The total squared error, $e^2$, is given by $$e^2 = \Sigma_X \eta^2(X) - \sum_{i=0}^{N} (a_i - \alpha_i)^2 (\Sigma_{\pi_0} S_i^2(X)) \quad (8)$$

Thus, the quantity $(e^2/\sigma^2)$ is distributed as a chi-square variate with $$[\Sigma_{\pi_0}(1) - (N + 1)]$$

degrees of freedom. To test the hypothesis that the coefficients $a_i$, $i = 1, 2, \ldots m$ ($m < N$) are in fact zero, we use the ratio $$F = \frac{\left[\left(\sum_{i=1}^{m} a_i^2 (\Sigma_X S_i^2(X))\right) / m\right]}{\left[e^2 / \left(\sum_{\pi_0}(1) - (N+1)\right)\right]} \quad (9)$$

which has F-distribution with $$(m, [\Sigma_{\pi_0}(1) - (N + 1)])$$

degrees of freedom and reject the hypothesis for large values of F.

By choosing the orthogonal polynomials as the basis functions, the coefficients for the following hyperquadric surface fit to the picture function in three-dimensions can be obtained as follows:

$$g(X_1, X_2, X_3) = b_0 + \sum_{i=1}^{3} b_i X_i + \sum_{i=1}^{3} b_{ii} X_i^2 + \sum_{\substack{i,j=1 \\ i<j}}^{3} b_{ij} X_i X_j \quad (10)$$

The estimates of the coefficients are given by:

$$b_i = \frac{\Sigma_{\pi_0} f(X) X_i}{\Sigma_{\pi_0} X_i^2} = \frac{bN_i}{bD_i} \quad (11)$$

$$b_{ii} = \frac{\Sigma_{\pi_0} f(X) (P_{i2}(X_i))}{\Sigma_{\pi_0}(P_{i2}^2(X_i))} = \frac{bN_{ii}}{bD_{ii}}$$

$$b_{ij} = \frac{\Sigma_{\pi_0} f(X) X_i X_j}{\Sigma_{\pi_0}(X_i X_j)^2} = \frac{bN_{ij}}{bD_{ij}}$$

$$b_0 = \frac{\Sigma_{\pi_0} f(X)}{\Sigma_{\pi_0}(1)} - \sum_{i=1}^{3} \frac{\mu_{i2}}{\mu_{i0}} b_{ii} \quad .$$

$$P_{i2}(X_i) = \left(X_i^2 - \frac{\mu_{i2}}{\mu_{i0}}\right) \text{ and } \mu_{ik} = \Sigma_{\pi_0} X_i^k$$

If the coordinate system is rotated by using an orthonormal rotation matrix D, the coordinates X in the original and the coordinates Y in the rotated coordinate system are related as $X = DY$ which is equal to the summation between the limits of $j = 1$ and 3 for the quantity $(d_{ij} y_j)$.

The fitted function $g(Y)$ can be expressed with respect to the rotated coordinates as $$g(Y) = C_0 + \sum_{i=1}^{3} C_i Y_i + \sum_{i=1}^{3} C_{ii} Y_i^2 + \sum_{\substack{i,j=1 \\ i<j}}^{3} C_{ij} Y_i Y_j \quad (12)$$

The coefficients b's and c's are related in terms of the elements of the rotating matrix D as follows:

$$C_0 = b_0 \quad (13)$$

$$C_i = \sum_{i=1}^{3} b_1 d_{1i}, \; 1 \leq i \leq 3$$

$$C_{ii} = \sum_{i=1}^{3} b_{1i} d_{1i}^2 + \sum_{\substack{l,m=1 \\ l<m}}^{3} b_{lm} d_{li} d_{mi}, \; 1 \leq i \leq 3$$

$$C_{ij} = 2\sum_{i=1}^{3} b_1 d_{1i} d_{1j} + \sum_{\substack{l,m=1 \\ l<m}}^{3} b_{lm}(d_{li}d_{mj} + d_{lj}d_{mi}), \; 1 \leq i<j \leq 3$$

Expressions for the variances of $C_i$ and $C_{ii}$ are given in the following:

$$\text{var}(C_i) = \sigma^2 \left[ \sum_{l=1}^{3} d_{li}^2 \frac{1}{(\Sigma_{\pi 0} X_l^2)} \right] \quad (14)$$

$$\text{var}(C_{ii}) = \sigma^2 \left[ \sum_{l=1}^{3} d_{li}^4 \frac{1}{\Sigma_{\pi 0} P_{l2}^2(X_l)} + \sum_{\substack{l,m=1 \\ l<m}}^{3} d_{li}^2 d_{mi}^2 \frac{1}{\Sigma_{\pi 0}(X_l X_m)^2} \right]$$

where $$P_{l2}(X_l) = X_l^2 \frac{-\mu_{l2}}{\mu_{l0}}$$

$$\mu_{lk} = \Sigma_{\chi_l} X_l^k$$

and $\chi_l$ is the domain of $X_l$.

Figure 6:
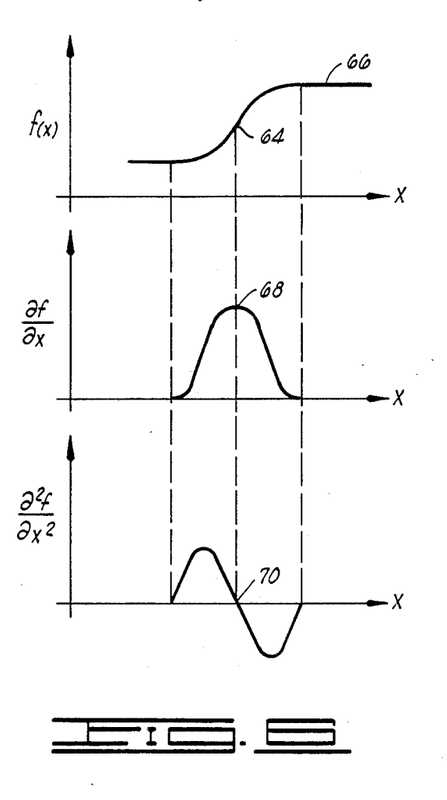
FIG. 6 are a series of related graphs depicting a step edge and its derivatives.

The sum of squares of errors of the fitted surface is independent of rotation in the coordinate system. A step edge and its derivatives are shown in the graphs of FIG. 6 to illustrate proof of an edge if the following conditions are satisfied: (a) the gradient in a direction normal to the direction of the edge is significantly different from zero; and, (b) the second directional derivative in the direction of the gradient is significantly zero. The sign of first directional derivative indicates the type of edge. It it is positive the edge is from right to left and if it is negative the edge is from left to right. Thus, relative to a median point 64 of curve 66 of f(X), the first derivative at point 68 is significantly greater than zero and the second derivative curve at point 70 is significantly zero.

Figure 7:
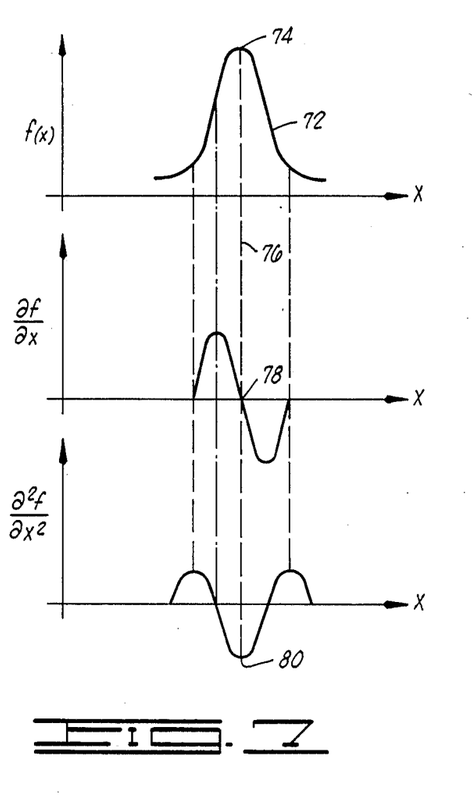
FIG. 7 is a series of interconnected graphs illustrating a roof top edge or line and its derivatives.

In like manner, for the existence of line, conditions are set up on directional derivatives in a direction perpendicular to the direction of line. As shown in FIG. 7, a line is characterized by f(X) curve 72 peaking at top point 74 with the first derivative curve indicating significantly zero along line 76 at point 78 and the second derivative curve showing a significantly greater than zero value at point 80. In effect, it is stated that the line is detected by performing the significance test in a direction perpendicular to the direction of the line for (a) the zeroness of the gradient; and, (b) the non-zeroness of the second derivative. The type of line is detected by looking at the sign of second directional derivative. If it is positive the line is due to trough and if it is negative the line is due to peak.

Figure 8:
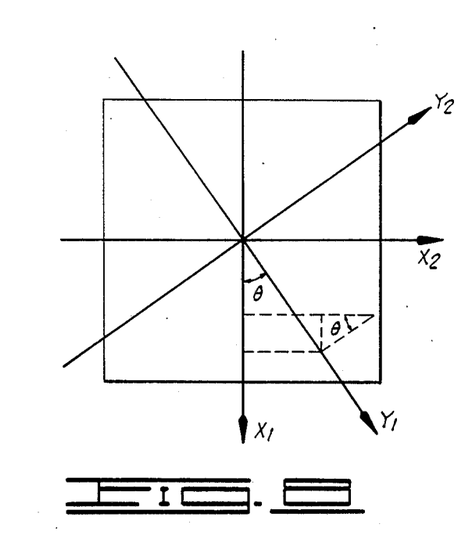
FIG. 8 is a graphic view illustrating the basic and rotated coordinate systems employed in the present invention.

FIG. 8 illustrates the rotated coordinate system $Y_1-Y_2$ with respect to the original coordinate system $X_1-X_2$. Thus, the original coordinate system $X_1-X_2$ is rotated counterclockwise by a selected angle $\theta$ to set up the coordinate system $Y_1-Y_2$. The rotation of the coordinate system and the D-matrix may be represented as follows:

$$X_1 = y_1 \cos\theta - y_2 \sin\theta \quad (15)$$

$$X_2 = y_1 \sin\theta + y_2 \cos\theta$$

$$X_3 = y_3$$

$$X = DY$$

$$D = \begin{bmatrix} \cos\theta & -\sin\theta & 0 \\ \sin\theta & \cos\theta & 0 \\ 0 & 0 & 1 \end{bmatrix}$$

Thus, the directional derivative of the fitted function g in the direction $Y_1$ is given by $$\frac{\partial g}{\partial y_1} = \frac{\partial g}{\partial X_1} \cos\theta + \frac{\partial g}{\partial X_2} \sin\theta \quad (16)$$

The angle $\theta$ that maximizes the directional derivative is given by $$\frac{\partial}{\partial \theta}\left(\frac{\partial g}{\partial y_1}\right) = -\frac{\partial g}{\partial X_1} \sin\theta + \frac{\partial g}{\partial X_2} \cos\theta = 0 \quad (17)$$

or $$\theta_G = \text{Tan}^{-1}\left(\frac{\partial g}{\partial X_2} / \frac{\partial g}{\partial X_1}\right)$$

For computing the direction of the line, the second directional derivative in the $Y_2$ is given by $$\frac{\partial^2 g}{\partial y_1^2} = \frac{\partial^2 g}{\partial X_1^2} \cos^2\theta + \frac{\partial^2 g}{\partial X_1 \partial X_2} 2 \cos\theta \sin\theta + \frac{\partial^2 \theta}{\partial X_2^2} \sin^2\theta \quad (18)$$

The direction of the line is estimated by maximizing the above expression. That is the direction of the line as determined from $$\frac{\partial}{\partial \theta}\left(\frac{\partial^2 g}{\partial y_1^2}\right) = 0$$

The angles $\theta_1$ and $\theta_2$, that satisfy this equation are given by (19)

$$\theta_1 = \text{Tan}^{-1}(2v_{12}|((v_{11} - v_{22}) + \sqrt{(v_{11} - v_{22})^2 + 4v_{12}}\,))$$

and $$\theta_2 = \text{Tan}^{-1}(2v_{12}|((v_{11} - v_{22}) - \sqrt{(v_{11} - v_{22})^2 + 4v_{12}}\,))$$

where $$v_{ij} = \frac{\partial^2 g}{\partial x_i \partial x_j}. \text{ Let}$$

$$\lambda_1 = ((v_{11} + v_{22}) + \sqrt{(v_{11} - v_{22})^2 + 4v_{11}^2}\,)|2$$

and

-continued $$\lambda_2 = ((\nu_{11} + \nu_{22}) - \sqrt{(\nu_{11} - \nu_{22})^2 + 4\nu_{11}^2}\ )/2$$

The angle $\theta_L = \theta_1$ is chosen as the direction of the line of $|\lambda_1| > |\lambda_2|$; otherwise, $\theta_L = \theta_2$ is chosen as the direction of the line. The angle $\theta_1$ corresponds to a line due to a trough in the data and the angle $\theta_2$ corresponds to a line due to a peak in the data.

All necessary variables having been determined and stored, computation then proceeds to declare $bN_i$, $bN_{ii}$, $bN_{ij}$, $bN_o$ and $b_i$, $b_{ii}$, $b_{ij}$, $b_o$ as derived previously at equations (11). The computations of flow step 62 performing tests of significance carry out computation of $\theta_G$ and $\theta_L$. Thus, it computes the coefficients $C_1$ and $C_{11}$ with the rotation matrix corresponding to $\theta_G$; and, there are then formed values $F_{e1}$ and $F_{e2}$ where $$F_{e1} = \frac{C_1^2 |\text{var}(C_1)|}{e^2|(\text{deg. of freedom } e^2)} \tag{20}$$

$$F_{e2} = \frac{C_{11}^2 |\text{var}(C_{11})|}{e^2|(\text{deg. of freedom } e^2)}$$

Then, letting $F_{e1c}$ and $F_{e2c}$ represent the critical values for $F_{e1}$ and $F_{e2}$, declare there is an edge if $F_{e1}$ is greater than $F_{e1c}$ and $F_{e2}$ is less then $F_{e2c}$. If there is proof of an edge, the program stops the gradient magnitude and direction for the pixel under consideration.

The next operation is to compute the coefficients $C_1$ and $C_{11}$ with the rotation matrix corresponding to $\theta_L$. Thus, in similar manner, there is formed the values $F_{L1}$ and $F_{L2}$ where $$F_{L1} = \frac{C_1^2 |\text{var}(C_1)|}{e^2|(\text{deg. of freedom } e^2)} \tag{21}$$

$$\text{and } F_{L2} = \frac{C_{11}^2 |\text{var}(C_{11})|}{e^2|(\text{deg. of freedom } e^2)}$$

Letting $F_{L1C}$ and $F_{L2C}$ represent the critical values for $F_{L1}$ and $F_{L2}$, the program then declares there to be a line if $F_{L1}$ is less than $F_{L1C}$ and $F_{L2}$ is greater than $F_{L2C}$. If there is a line proven, then the magnitude and direction for the pixel under consideration is stored. Similar tests may be performed for the detection of edge and line at any arbitrary direction $\theta$, if desired.

Upon performance of the test for significance for the first neighborhood in stage 62, flow proceeds to a query stage 82 to determine whether or not this is the last neighborhood to be examined and, if not, the program recycles to operation of flow stage 84 to consider the next succeeding neighborhood in the $X_2$ direction. The flow stage 86 then performs a recursive relationship operation to compute the coefficients of the current neighborhoods fitted function by updating as operation recycles through the significance testing stage 62 for the next or current neighborhood processing. The function of the recursive and computative stage 86 sets the size of the neighborhood in the $X_2$ coordinate direction so that if $N_2$ is odd, then $N_{22}$ is equal to $N_2/2$ and is truncated to an integer value (e.g. if $N_2 = 5$, then $N_{22} = 2$). $N2I$ then sets the starting value of $X_2$ of the current neighborhood and there is definition as follows:

$$\begin{aligned} II &= N2I - 1 \\ IL &= II + N_2 \\ N221 &= N_2 + 1 \end{aligned} \tag{22}$$

$$X120 = \frac{\mu 12}{\mu 10}$$

$$X320 = \frac{\mu 32}{\mu 30}$$

$$PNW1 = \frac{\mu 22}{\mu 20} - 2\ N22 - 1.0 - N22^2,$$

$$PNW2 = N22^2 - \frac{\mu 22}{\mu 20}$$

$$FIL1 = -F1(II, 1) + F1(ILL, 1)$$

Updating the numerators of the coefficients b's is as follows:

$$bN_{12} = bN_{12} - bN_1 + N221 \cdot F1(Ii,2) + N22 \cdot F1(ILL,2)$$

$$bN_{13} = bN_{13} - F1(II,6) + F1(ILL,6)$$

$$bN_{23} = bN_{23} - bN_3 + N221 \cdot F1(II,3) + N22 \cdot F1(ILL,3)$$

$$bN_{11} = bN_{11} - F1(II,4) + F1(ILL,4) - X120 \cdot FIL1$$

$$bN_{22} = bN_{22} - 2.0bN_2 + bN_0 + PNW1 F1(II,1) + PNW2 F1(ILL,1)$$

$$bn_{33} = bN_{33} - F1(II,5) + F1(ILL,5) - X320\ FIL1$$

$$bN_1 = b\dot{N}_1 - F1(II,2) + F1(ILL,2) \tag{23}$$

$$bN_2 = bN_2 - bN_0 + N221\ F1(II,1) + N22 F1(ILL,1)$$

$$bN_3 = bN_3 - F1(II,3) + F1(ILL,3)$$

$$N_0 = bN_0 + FIL1$$

The program then effects computation of the values $B_i$, $B_{ii}$, $B_{ij}$ and $B_o$ in accordance with equations (11) as the current neighborhood data is stored subject to significance tests for edge or line presence. All successive neighborhoods in the $X_2$ direction are processed for computational coefficients and performance of tests of significance for edge and line detection until the decision stage 82 finds an affirmative for the last neighborhood in the $X_2$ direction, whereupon the program moves forward to a decision stage 88 for query as to whether or not the last line of the data has been read in the $X_1$ direction. If not, flow proceeds to stage 90 which reads from storage the next line of data of size $m_2 \times N_3$, and flow stage 92 forms a current set of $N_1$ lines and computes their parameters by recursive update. The new set of lines in the $N_1$ dimension must then be processed through the successive neighborhoods from the first through the last. Thus, the program recycles back through flow stage 58 to consider the first neighborhood of the next successive set of $N_1$ lines.

In operation, the flow stage 92 transfers the last $N_1 - 1$ lines of size $m_2 \times 3$ of $F2(X_1, X_2, X_3)$ into the first $N_1 - 1$ lines. That is, $F2(i, X_2, X_3) = F2(i+1, X_2, X_3)$ for $1 \leq i \leq N_1 - 1$. Using the currently read line of data there is computed $F2(N_1, X_2, X_3)$ for $1 \leq X_2 \leq m_2$ and $1 \leq X_3 \leq 3$. Letting FC $(X_2, X_3)$, $1 \leq X_2 \leq m_2$, $1 \leq X_3 \leq N_3$, be equal to the currently read line of data, and let $\pi_3$ be the domain of $X_3$. Then, for every $X_2$ compute the following:

$$F3(X_2,1) = \Sigma_{\pi 3} FC(X_2,X_3) \quad (24)$$

$$F3(X_2,2) = \Sigma_{\pi 3} X_3 FC(X_2,X_3)$$

$$F3(X_2,3) = \Sigma_{\pi 3} X_3{}^2 FC(X_2,X_3)$$

Let the size of the neighborhood $N_1$ in the $X_1$ coordinate direction be odd, and let $N12 = N1|2$ and be truncated to an integer value, and let $N121 = N12+1$; then, the parameters of the current set of lines F1's are updated as follows:

$$F1(X_2,6) = F1(X_2,6) - F1(X_2,3) + N121 F2(1,X_2,2) + N12 F3(X_2,2)$$

$$F1(X_2,5) = F1(X_2,5) - F2(1,X_2,3) + F3(X_2,3) \quad (25)$$

$$F1(X_2,4) = F1(X_2,4) - 2F1(X_2,1) - N121^2 F2(1,X_2,1) + N12^2 F3(X_2,1)$$

$$F1(X_2,3) = F1(X_2,3) - F2(1,X_2,2)$$

$$F1(X_2,2) = F1(X_2,2) - F1(X_2,1) + N121 F2(1,X_2,1) + N12 F3(X_2,1)$$

$$F1(X_2,1) = F1(X_2,1) - F2(1,X_2,1) + F3(X_2,1)$$

Figure 9:
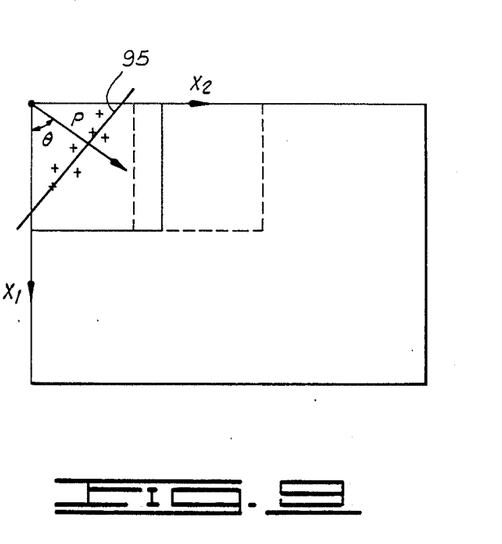
FIG. 9 is a graphic depiction illustrating the concept of overlapping blocks, the portion of the coordinate system and the definition of the parameters O and P.
Figure 10:
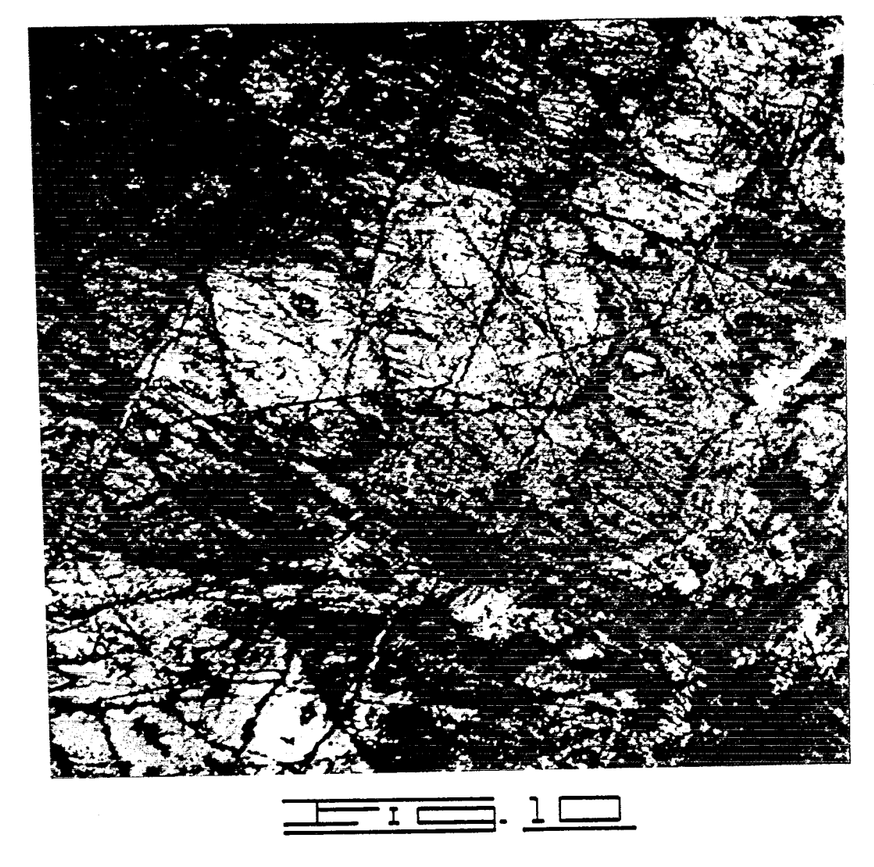
FIG. 10 is a photograph of a Landsat, band 4, image.
Figure 11:
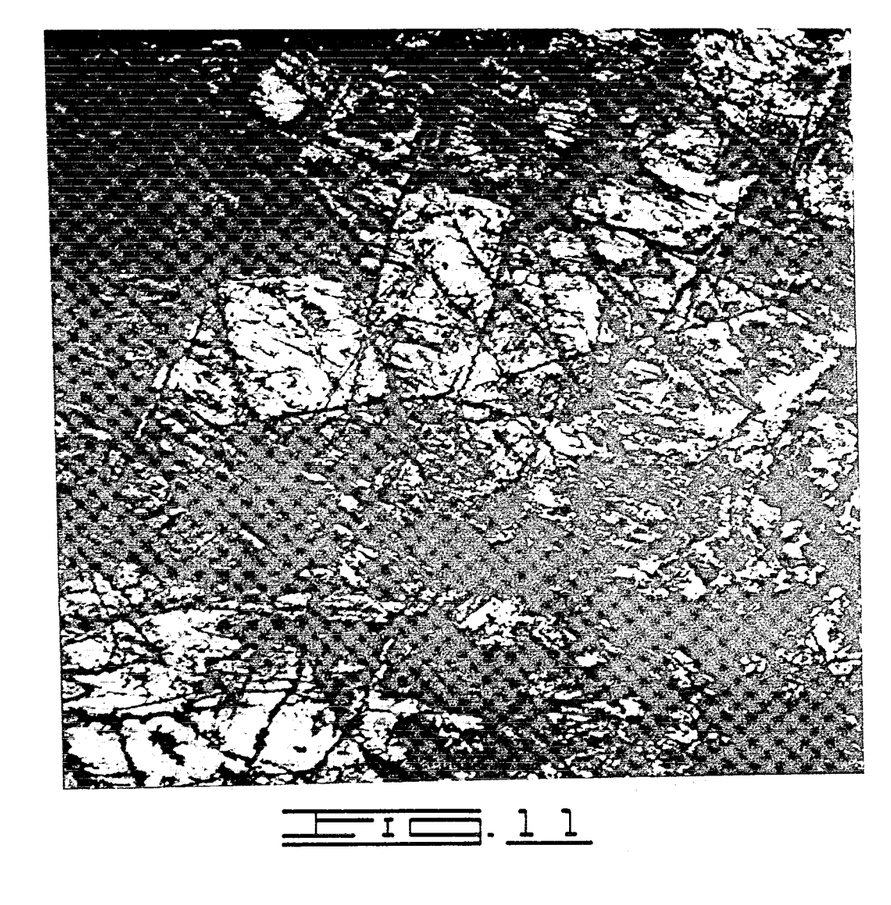
FIG. 11 is a photograph of a Landsat, band 5, image.
Figure 12:
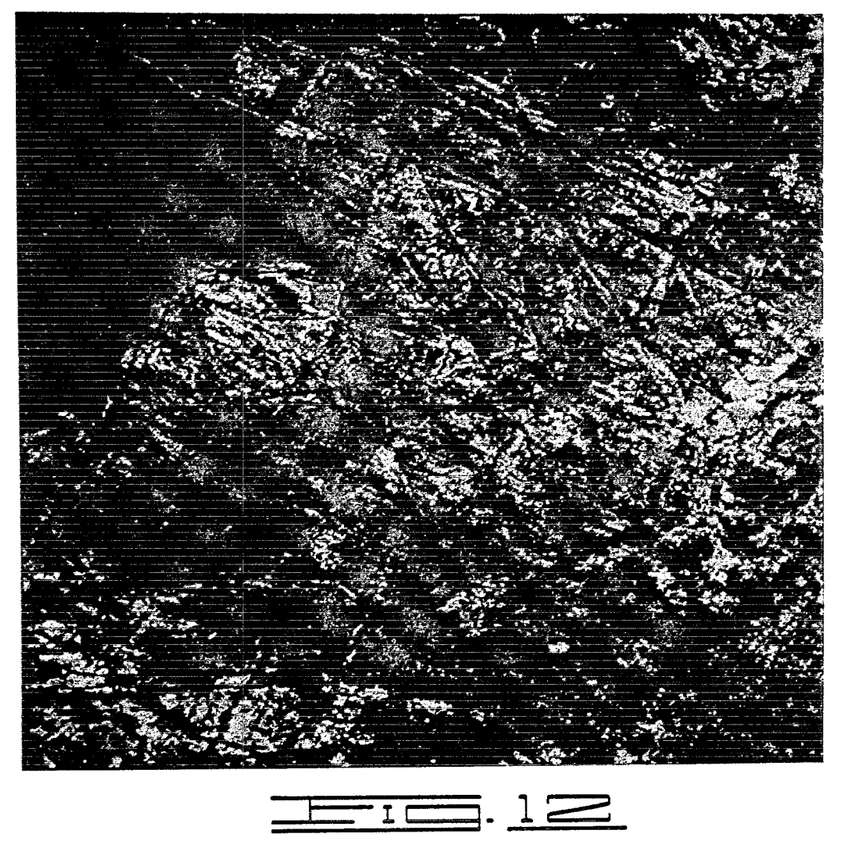
FIG. 12 is a photograph of a Landsat, band 6, image.
Figure 13:
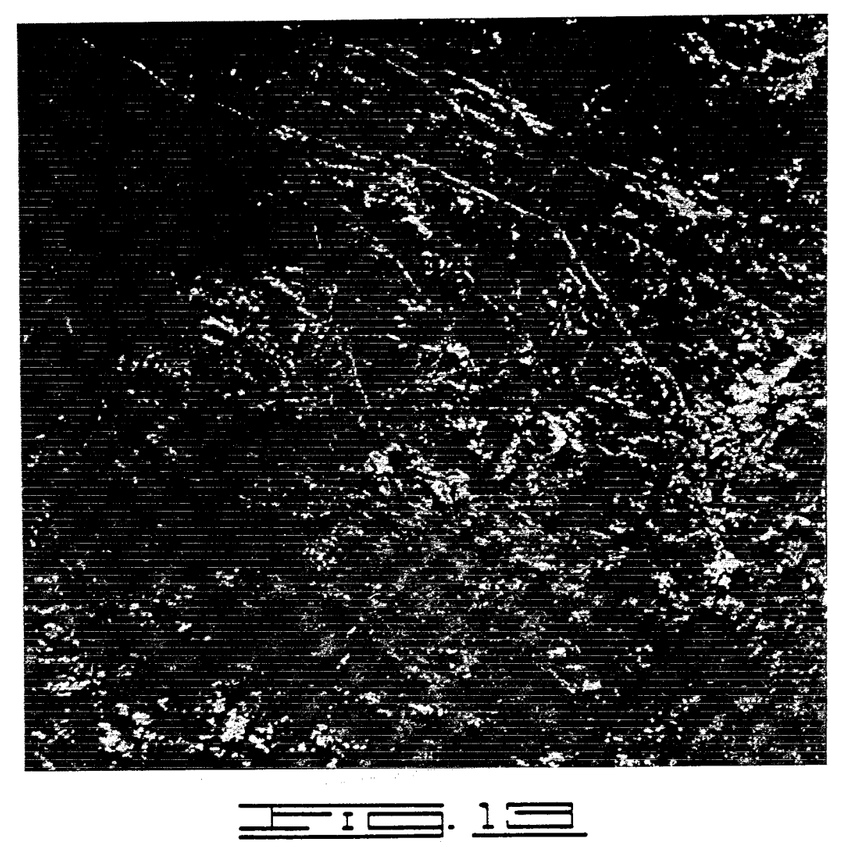
FIG. 13 is a photograph of a Landsat, band 7, image.

After processing of all neighborhoods in the $X_2$ direction successively for all lines in the $X_1$ direction, i.e. a complete neighborhood coverage of the image, all edge and line data is computed, tested for significance and stored. When the last of the data has been read, the decision stage 88 signals an affirmative and data processing proceeds to flow stage 94 which effects linking of detected edges and lines. In flow stage 94, for edge or line linking the image is divided into overlapping blocks of certain size. Consider one block of pixels. Let the coordinate system be positioned such that the origin is at the top left corner of the block. FIG. 9 illustrates the concept of overlapping blocks and the parameters $\rho$ and $\theta$ that define the line 95. The angle $\theta$ defines the orientation of normal to the line 95 from $x_1$ axis and $\rho$ is the distance of the line 95 along normal from the origin. Bins of certain size are setup in the $(\rho,\theta)$ space. At each pixel in the block where an edge or line is detected, the parameters $\rho$ and $\theta$ are computed for that edge or line. These are quantized and are used to update the count in the appropriate bin of the $(\rho,\theta)$ space. The bins in the $(\rho,\theta)$ space are scanned and the bins whose count exceed certain present threshold are marked. The pixels corresponding to the marked bins are linked by lines. The process is repeated for every block.

Figure 14:
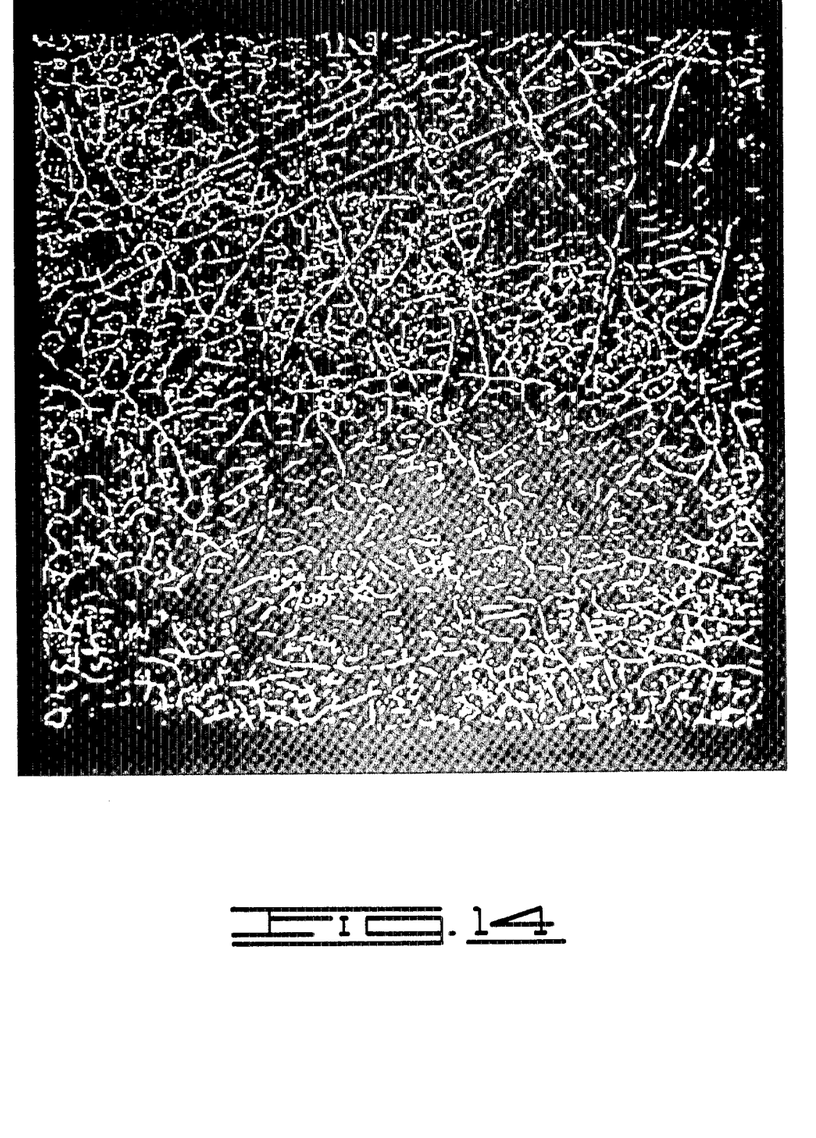
FIG. 14 is an image of detected significant lines thresholded at a high percentage confidence level.
Figure 15:
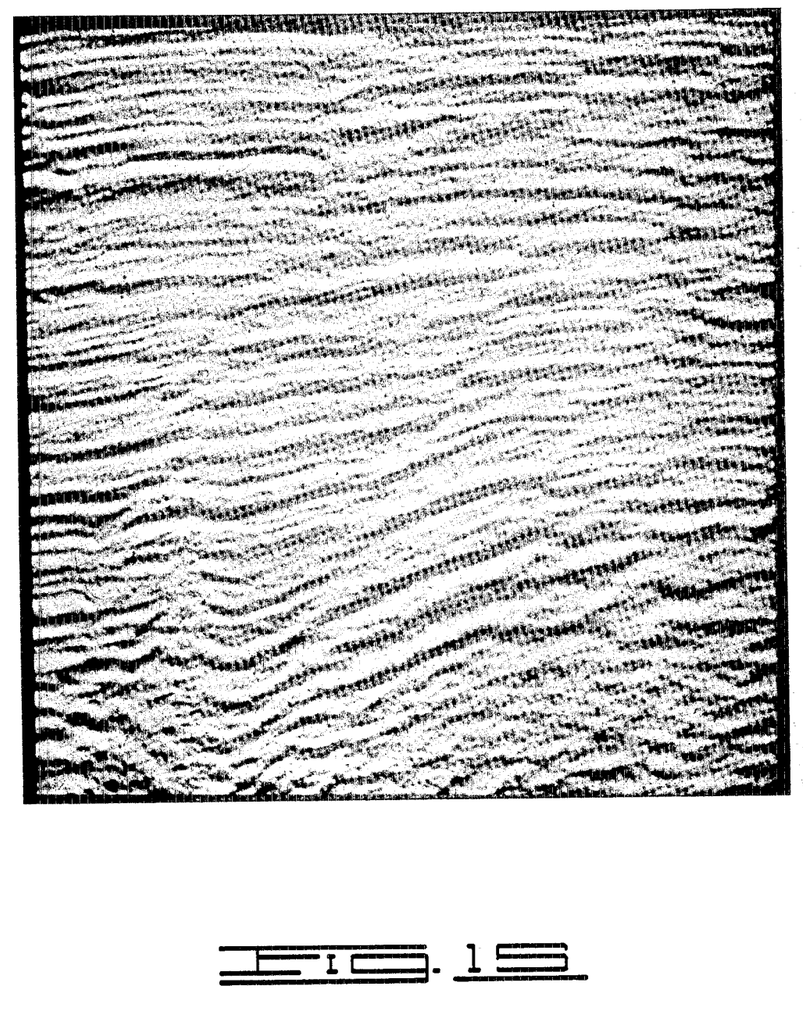
FIG. 15 is a compressional wave seismic section.
Figure 16:
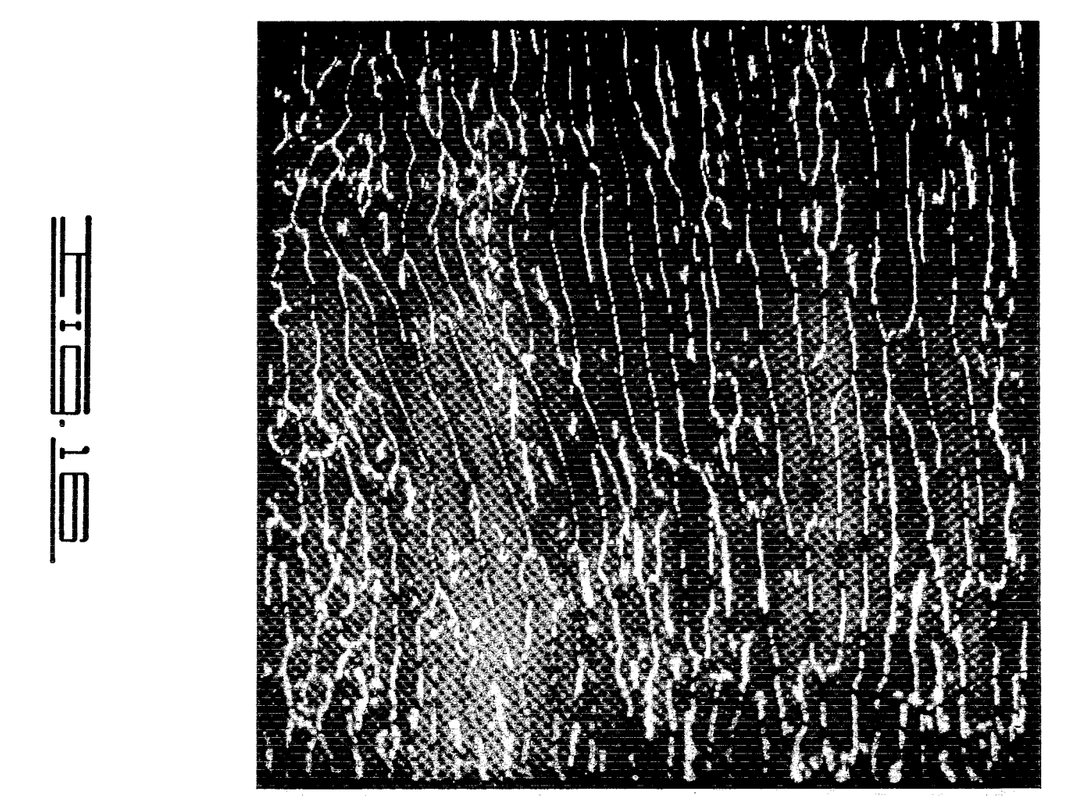
FIG. 16 is an overlay of detected troughs on the original seismic section.
Figure 17:
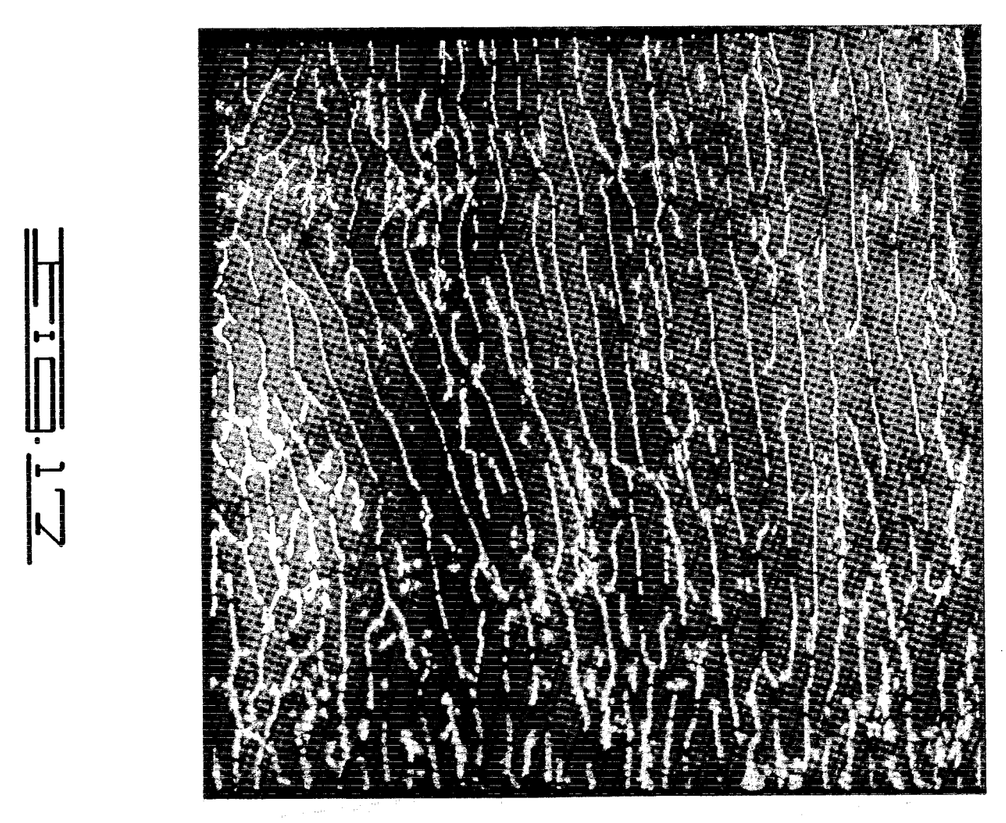
FIG. 17 is an overlay of detected and linked troughs on the orignal seismic section.

The photo-reproductions of FIGS. 10 through 17 illustrate final display results of image analysis performed with processing system 20. FIGS. 10, 11, 12 and 13 represent Landsat data for Landsat bands 4, 5, 6 and 7, respectively, as scanned over an area in Australia from an altitude of 250 miles. The Landsat band response designations are as follows:

Landsat Band 4—0.5 to 0.6 microns
Landsat Band 5—0.6 to 0.7 microns
Landsat Band 6—0.7 to 0.8 microns
Landsat Band 7—0.8 to 1.1 microns The multi-band Landsat data or the multi-dimensional portion $N_3$ of an image $m_1 \times m_2 \times N_3$, was processed in accordance with the system 20. FIG. 14 is a final output display and detected lines in the image. The lines are detected with threshold set at a high percent confidence level, e.g. 95% confidence level, and it can readily be seen that many significant lineaments in many different directions are highlighted in the display. The alignments, continuances, cross-overs and diverse linear patterns are presented in enhanced form that is not readily discernible in the one or more raw data band images of FIGS. 10-13. The detected line can further be sorted into peak or trough. To support this argument, the system 20 is used to detect troughs in seismic data. FIG. 15 is a compressional wave seismic section. FIG. 16 contains the detected troughs. These are further linked and are shown in FIG. 17.

The foregoing discloses a novel method for edge and line detection of multidimensional image data utilizing machine processing. The method of the present invention is particularly valuable in defining edge and line formation within noisy image data as the process functions to define edge and line magnitude and orientation and allows further linking in tomographic manner.

While the machine process of the present invention is particularly set forth in terms of specific steps and data processing manipulations, it should be understood that similar processing functions obtaining the same general results can be implemented without departing from the spirit and scope of the invention as defined in the following claims.

The embodiments of the invention in which an exclusive property or privilege is claimed are defined as follows:

1. A machine process for analysis of multidimensional data for detection of edge and line distinctions, comprising the steps of:
    inputting multi-dimensional digital image data of line dimensions $m_1 \times m_2 \times N_3$;
    determining denominators of coefficients for fitting a hypersurface to function values in a neighborhood of dimension $N_1 \times N_2 \times N_3$;
    computing global parameters for $N_1$ lines of $m_1$ lines of data of size $m_2 \times N_3$;
    examining a first pixel neighborhood of $N_1 \times N_2 \times N_3$ dimension and computing the coefficients of a fitting surface;
    computing for a central pixel of the neighborhood a direction perpendicular to a direction of generally linear discontinuity;
    performing tests of significance on directional derivatives of a fitted surface along a direction perpendicular to the direction of discontinuity to derive edge and line data;
    deriving such edge and line data for central pixels of successive neighborhoods by computing the coefficients of the fitting hypersurface through updating, estimating the directions of edges and lines, and performing the tests of significance on the directional derivatives;
    repeating the process for all sequential $N_1$ lines of said $m_1$ lines of data by updating the global parameters; and
    outputting said edge and line data for visual display.

2. A machine process as set forth in claim 1 which is further characterized to include:
    estimating the parameters of the hypersurface that is fitted to digital data of neighborhoods of dimension $N_1 \times N_2 \times N_3$.

3. A machine process as set forth in claim 1 wherein:
    $S_a$ and $S_b$ are successive neighborhoods of dimension $N_1 \times N_2 \times N_3$ and subsets of $N_1$ lines of $m_2 \times N_3$ dimension;

each $S_b$ is obtained from $S_a$ by adding a column $N_1 \times N_3$ and deleting a column $N_1 \times N_3$;

the parameters of $N_1$ lines and the parameters of hypersurface are fitted to data of $S_a$; and estimated parameters of hypersurface are fitted to data of $S_b$ by updating previous parameters of hypersurface as fitted to data of $S_a$.

4. A machine process as set forth in claim 1 wherein:

a set $L_b$ of $N_1$ lines of dimension $m_2 \times N_3$ are obtained from each set $L_a$ of $N_1$ lines of dimension $m_2 \times N_3$ by adding a line of $m_2 \times N_3$; and parameters of $L_b$ are obtained by updating parameters of $L_a$.

5. A machine process as set forth in claim 1 wherein: direction and types of edges and lines are estimated for the central pixel of each neighborhood of dimension $N_1 \times N_2 \times N_3$.

6. A machine process as set forth in claim 5 wherein: with the data assumed to have gaussian noise, variances are computed for first and second directional derivatives of the fitted hypersurface.

7. A machine process as set forth in claim 1 wherein: edges and lines are detected by performing the statistical tests of significance on a first and second directional derivative of the fitted hypersurface in a direction perpendicular to an estimated direction of edges and lines.

8. A machine process as set forth in claim 1 wherein: said digital image data is processed to detect peaks, troughs and zero crossings.

9. A machine process as set forth in claim 1 wherein: said image data is landsat scan data in plural spectal response data representations.

10. A machine process as set forth in claim 1 wherein: said image data is three-dimensional seismic energy data.

* * * * *